Figure 1:
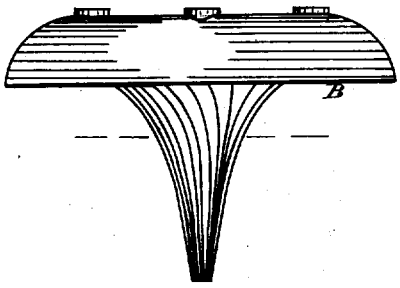

F. A. PERRY.
Spark Arrester.

No. 9,420. Reissued Oct. 19, 1880.

WITNESSES.
S. N. Berney
G. E. Dutton

INVENTOR.
Francis A. Perry
per Alfred Berney
attorney

N. PETERS, PHOTO-LITHOGRAPHER, WASHINGTON, D. C.

UNITED STATES PATENT OFFICE.

FRANCIS A. PERRY, OF KEENE, NEW HAMPSHIRE.

SPARK-ARRESTER.

SPECIFICATION forming part of Reissued Letters Patent No. 9,420, dated October 19, 1880.

Original No. 153,907, dated August 11, 1874; Reissue No. 9,363, dated August 31, 1880. Application for reissue filed March 26, 1880.

DIVISION A.

*To all whom it may concern:*

Be it known that I, FRANCIS A. PERRY, of the city of Keene, State of New Hampshire, have invented a new and useful Improvement in Cones for Locomotive or other Stacks, of which the following is a specification, reference being had to the accompanying drawings, making part of this specification.

The invention relates to cones for preventing sparks from wearing out the netting of stacks, for breaking sparks up, and for driving sparks back into spark-chambers or to the fire-box.

Heretofore cones have been made smooth or with wings, projections, or corrugations upon the under side. While these may work well, my improvement of rifling guides them to the place desired with great velocity, and renders them harmless by breaking them up.

The object of my invention is to provide a cone that will prevent the netting from wearing out rapidly, yet allow the gases and steam to escape easily, and prevent fires by grinding the sparks smaller or guiding them to spark-chambers. The spiral motion given to them increases the velocity, by which they go more directly to the place desired. In spark-consuming engines I curve the outer lips farther down than for a plain engine. When the blast from the exhaust-steam carries the sparks against the under side of the cone they enter the grooves and there receive a rifle motion similar to that which a shot out of a gun receives, and fall into a chamber with more accuracy.

It consists of a cone of the usual outer shape; but the under part is cut into spiral grooves of any style, as shown in the drawings.

Figure 2:
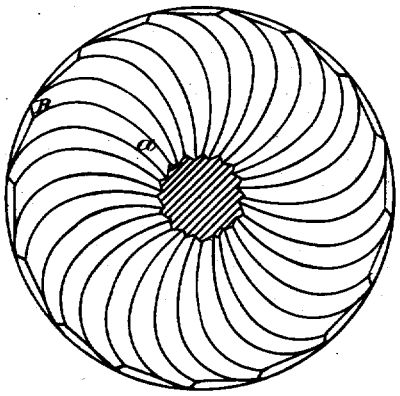
Figure 3:
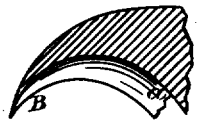

In the accompanying drawings, in which similar letters of reference indicate like parts, Figure 1 is an elevation. Fig. 2 is a plan and section of the same. Fig. 3 is a section.

The rifled grooves *a* are cast so as to wind around the cone and terminate at B, and can be cast in the usual manner.

I do not claim cones with curved wings or plain grooves, as they are old.

I am aware that a cone with wings made in spiral form is old; also, a sheet-metal cone with rifle-spaces is old; but I am not aware of any rifle-cone cast with grooves beginning at the point and ending at the outer edge, as mine is shown, terminating at the circle.

What I claim is—

In a spark-arrester, a solid cone with its under surface cast or formed in spiral-shaped grooves or spaces, constructed and arranged substantially as described, and for the purposes set forth.

FRANCIS A. PERRY.

Witnesses:
EDWARD JOSLIN,
GEO. A. LITCHFIELD.